United States Patent Office 2,799,667
Patented July 16, 1957

2,799,667

PRODUCTION OF LINEAR POLYESTERS

James Gordon Napier Drewitt, Spondon, near Derby, and James Lincoln, London, England, assignors to British Celanese Limited, a British company No Drawing. Application August 5, 1952,
Serial No. 302,822

Claims priority, application Great Britain August 20, 1951

18 Claims. (Cl. 260—77.5)

This invention relates to improvements in the production of polymeric compounds and is more particularly concerned with the production of linear polyesters.

According to the present invention polyesters are produced by condensation of a free dicarboxylic acid with a cyclic carbonate of a glycol, for example cyclic ethylene carbonate, cyclic trimethylene carbonate and the cyclic carbonate of propylene glycol. These cyclic carbonates are readily produced by reaction between the appropriate glycol and a carbonate of a monohydric alcohol in presence of an ester-interchange catalyst, for example an alkali metal such as sodium or potassium or magnesium. Dibutyl carbonate is a very suitable reagent for this purpose. During the course of the condensation of the cyclic carbonate with the free dicarboxylic acid, carbon dioxide is evolved and the glycol condenses with the dicarboxylic acid to build up the polymer.

While the invention may be applied to the production of polymers from glycols and aliphatic dicarboxylic acids such as adipic acid, suberic acid and sebacic acid or from aromatic aliphatic acids such as para-phenylene diacetic acid, its principal advantages are obtained when high-melting aromatic dicarboxylic acids are used capable of yielding high-melting polyesters. Such aromatic acids include terephthalic acid and certain substituted terephthalic acids, diphenyl-4.4'-dicarboxylic acid, $\alpha.\beta$-diphenylethane-4.4'-dicarboxylic acid, $\alpha.\delta$-diphenylbutane-4.4'-dicarboxylic acid and other $\alpha.\omega$-diphenylalkane-4.4'-dicarboxylic acids, $\alpha.\beta$-diphenoxyethane-4.4'-dicarboxylic acid, $\alpha.\delta$-diphenoxybutane-4.4'-dicarboxylic acid and other $\alpha.\omega$-diphenoxyalkane-4.4'-dicarboxylic acids, and the 1.5-, 2.6- and 2.7-naphthalene-dicarboxylic acids. All these dicarboxylic acids have their carboxy groups linked to the aromatic nucleus or nuclei in such a way that (taking the shortest path through the carbon atoms of the nucleus) there are at least four nuclear carbon atoms in each nucleus between the linkages. In this definition a single benzene ring or a single naphthalene ring counts as one aromatic nucleus, while diphenyl

and diphenyl alkane

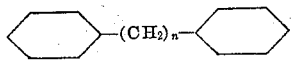

count as two aromatic nuclei. The preferred dicarboxylic acids are those whose carboxy groups are linked to the aromatic nuclei in diametrically opposite positions, that is to say in the para position with a single benzene nucleus, in the 4.4' position with compounds containing two benzene nuclei, and in the 1.5 or 2.6 positions with compounds of the naphthalene series.

All these dicarboxylic acids have very high melting points, if they melt at all, and are insoluble or substantially insoluble in all the common solvents. As a result, when it is attempted to condense these dicarboxylic acids in the free state with free glycol, a very considerable period elapses before the mixture is homogeneous. For example, with terephthalic acid and ethylene glycol or with $\alpha.\beta$ - diphenoxyethane - 4.4'- dicarboxylic acid and ethylene glycol the period may be between two and three days. In the result these free dicarboxylic acids are not used commercially to make the polymers which are made by a process of ester interchange between the glycol and an alkyl ester of the dicarboxylic acid. A great advantage of the cyclic glycol carbonates used according to the present invention is that they have relatively good solvent power for the free dicarboxylic acids and hence considerably reduce the time necessary to achieve homogeneity of the reaction mass. Thus the mixture may become homogeneous in about one or two hours and in some cases even less. In the result, the whole period for producing a polyester, for example one having fibre-forming and cold-drawing properties, is considerably reduced.

The proportion in which the cyclic glycol carbonate is employed has an important bearing upon the nature and the constitution of the product. For example, when a cyclic ethylene carbonate is heated with terephthalic acid in a molar ratio of between 1.0 and 1.3 moles of cyclic carbonate to 1 mole of terephthalic acid, a product is produced having a melting point and other properties very close to those of the polyester produced directly from ethylene glycol and dimethyl terephthalate. If, however, the cyclic glycol carbonate is used in a higher proportion, for example 2 moles of cyclic carbonate to 1 mole of terephthalic acid, the product, while still crystalline, fibre-forming and capable of being cold drawn, has a lower melting point. For some purposes and with some reagents this is an advantage. Thus, for instance, the polymer from diphenyl-4.4'-dicarboxylic acid and ethylene glycol melts at a temperature rather too high for ease of melt spinning. In such a case it is possible, according to the present invention, to use the cyclic carbonate in excess so as to achieve a lower melting point. The production of a polymer having a lower melting point is exemplified below in Example 3 using terephthalic acid.

A polyester from a dicarboxylic acid and two or more different glycols may be produced according to the present invention by using the free dicarboxylic acid and a mixture of the cyclic carbonates of the two glycols. Alternatively the cyclic carbonate of one of the glycols may be used together with the other glycol in the free state. In such a case it is advisable to use the free glycol in a proportion such that the mixture of it with the cyclic glycol carbonate still has a high solvent power for the free dicarboxylic acid used. This production of mixed polyesters constitutes another method by which polymers melting in the range suitable for melt spinning operations, e. g. 230 or 240–280° C., may be produced using dicarboxylic acids such as dipheny-4.4'-dicarboxylic acid, which with a single glycol such as ethylene glycol normally produce polymers which are too high melting.

The condensation between the free dicarboxylic acid and the cyclic carbonate is carried out at relatively high temperatures. Temperatures of the order of 200–250° C. may be used, especially in the early stages, and in the later stages still higher temperatures, for example 250–300° C. In these later stages it is desirable to carry out the reaction under low pressure, for example a pressure of the order of 2 mms. of mercury or less. The polyesterification is preferably continued until a product having fibre-forming properties is produced, and preferably one having cold-drawing properties.

The reaction may be carried out in the presence of an ester-interchange catalyst, for example magnesium, sodium, sodium and magnesium or lithium or alkoxides thereof. Such a catalyst may be added at the beginning of the reaction or may be added at the point when the reaction mixture becomes homogeneous. If there is any tendency to charring in the early stages while the dicarboxylic acid is in the solid state, it is advisable to carry out this stage of the reaction before the reaction mixture becomes homogeneous at a relatively low temperature, for example around 200° C., until the solid is all dissolved.

The following examples illustrate the invention but do not limit it in any way. In all cases the quantities used are by weight and the melting points of the resulting polymers are uncorrected melting points. Generally the corrected melting points are about 5° higher.

*Example 1*

24.9 parts of terephthalic acid and 14.5 parts of cyclic ethylene carbonate (molar ratio of acid to carbonate 1:1.1) were mixed and heated together under reflux on a bath at a temperature of 270° C. under nitrogen until the terephthalic acid went into solution and the evolution of carbon dioxide became negligible. This occupied a period of less than 3 hours. At this stage a small quantity of magnesium ribbon was added and the temperature taken up to 280° C. for a period of 1 hour, the reflux condenser removed and heating continued at 280° C. for a further 6 hours under an absolute pressure of 5 mms. of mercury. The product was a white crystalline polymer having a melting point of 252° C. and was fibre-forming and capable of being cold drawn.

*Example 2*

24.9 parts of terephthalic acid and 15.85 parts of cyclic ethylene carbonate (molar ratio of acid to carbonate 1:1.2) were heated under reflux at 270° C. for 2 hours. At this stage a small quantity of magnesium ribbon was added and heating continued at 270° C. for a further hour. The reflux condenser was then removed, the temperature raised to 280° C. under an absolute pressure of 5 mms. of mercury, and heating under these conditions continued for 3½ hours. Again the product was a white crystalline polymer, melting point 240° C., fibre-forming and capable of being cold drawn.

*Example 3*

24.9 parts of terephthalic acid and 26.4 parts of cyclic ethylene carbonate (molar ratio of acid to carbonate 1:2.0) were mixed and heated under a reflux condenser to a temperature of 270° C. The terephthalic acid dissolved completely in 45 minutes and evolution of carbon dioxide ceased after another 4½ hours. At this stage a small quantity of magnesium ribbon was added and heating continued first for 3 hours at 250° C., the reflux being then removed, then for 7 hours at 270° C. and finally for 3 hours at 270° C. under an absolute pressure of 5 mms. of mercury. The resulting crystalline polymer had a melting point of 235° C. and was fibre-forming and could be cold drawn.

Having described our invention what we desire to secure by Letters Patent is:

1. Process for the production of polyesters, which comprises condensing a free dicarboxylic acid with a cyclic glycol carbonate until a polymer is produced.

2. Process according to claim 1, wherein the acid is an aromatic dicarboxylic acid.

3. Process for the production of a polyester, which comprises heating free terephthalic acid with cyclic ethylene carbonate in presence of an ester-interchange catalyst until a fibre-forming polymer having cold-drawing properties is produced.

4. Process for the production of linear polyesters, which comprises heat condensing a monomeric cyclic glycol carbonate with a free dicarboxylic acid until a polymer is produced, the acid being selected from the group consisting of benzene para-dicarboxylic acids and compounds containing two benzene rings linked together, each benzene ring being substituted with only one carboxy group in the para position.

5. Process for the production of linear polyesters, which comprises heat condensing a monomeric cyclic glycol carbonate with a free dicarboxylic acid until a polymer is produced, the acid being an aromatic dicarboxylic acid with its carboxy groups positioned symmetrically in the molecule at opposite ends of the molecule.

6. Process for the production of linear polyesters which comprises heat condensing free terephthalic acid with cyclic ethylene carbonate until a polymer is produced.

7. Process for the production of linear polyesters, which comprises heat condensing until a polymer is produced a cyclic monomeric glycol carbonate with a free dicarboxylic acid having its carboxy groups linked to aromatic nuclei in diametrically opposite positions.

8. Process according to claim 7 wherein the dicarboxylic acid is terephthalic acid.

9. Process according to claim 7 where the dicarboxylic acid is 4:4'-diphenyl dicarboxylic acid.

10. Process according to claim 7 wherein the dicarboxylic acid is a 4:4'-dicarboxylic acid of an $\alpha$:$\omega$-diphenylalkane.

11. Process according to claim 7 wherein the dicarboxylic acid is a 4:4'-dicarboxylic acid of an $\alpha$:$\omega$-diphenoxyalkane.

12. Process according to claim 7 wherein the dicarboxylic acid is a naphthalene dicarboxylic acid.

13. Process for the production of linear polyesters, which comprises heat condensing a cyclic monomeric glycol carbonate with a free dicarboxylic acid until a polymer is produced, said acid being a bifunctional aromatic compound selected from the group consisting of benzene 1:4-, diphenyl 4:4'-, $\alpha$:$\omega$-diphenoxyalkane 4:4'-, $\alpha$:$\omega$-diphenylalkane 4:4'- and naphthalene 1:5-, 2:6- and 2:7-dicarboxylic acids.

14. Process for the production of linear polyesters which comprises heat condensing a free dicarboxylic acid and a monomeric cyclic alkylene glycol carbonate until a linear polyester is produced.

15. Process for the production of linear polyesters, which comprises heat condensing a free dicarboxylic acid with a monomeric cyclic alkylene glycol carbonate until a linear polyester is produced, the molecular ratio of the glycol carbonate to the dicarboxylic acid employed in the process being between 1:1 and 1.3:1.

16. Process for the production of linear polyethylene terephthalate which comprises heat condensing free terephthalic acid with monomeric ethylene glycol carbonate until linear polyethylene terephthalate is produced, the molecular ratio of the ethylene glycol carbonate to the terephthalic acid employed in the process being between 1:1 and 1.3:1.

17. Process for the production of linear polyethylene terephthalate, which comprises heating free terephthalic acid with monomeric cyclic ethylene glycol carbonate and, at least in the later stages of the reaction, an ester-interchange catalyst to a temperature between 200° and 300° C. until a fibre-forming product has been formed.

18. Process according to claim 17, wherein during at least the later stages of the reaction the temperature is between 250° and 300° C., and the pressure is below 2 mm. of mercury.

References Cited in the file of this patent

UNITED STATES PATENTS

| | | |
|---|---|---|
| 1,882,808 | Graves | Oct. 18, 1932 |
| 2,071,250 | Carothers | Feb. 16, 1937 |
| 2,448,767 | Carlson | Sept. 7, 1948 |
| 2,465,319 | Whinfeld et al. | Mar. 22, 1949 |